United States Patent [19]

Draghetti

[11] Patent Number: 5,287,954
[45] Date of Patent: Feb. 22, 1994

[54] DEVICE FOR EQUALLY-SPACED IN-LINE TRANSPORTATION OF RANDOMLY ARRANGED INCOMING PRODUCTS

[75] Inventor: Fiorenzo Draghetti, Medicina, Italy

[73] Assignee: G.D Societa' per Azioni, Bologna, Italy

[21] Appl. No.: 899,297

[22] Filed: Jun. 16, 1992

[30] Foreign Application Priority Data

Jun. 21, 1991 [IT] Italy .................. BO91A 000221

[51] Int. Cl.[5] ............................................. B65G 47/26
[52] U.S. Cl. .................................... 198/461; 198/460; 198/626.1
[58] Field of Search ............... 198/459, 460, 461, 462, 198/626.1

[56] References Cited

U.S. PATENT DOCUMENTS

| | | | |
|---|---|---|---|
| 2,679,313 | 5/1954 | Gueffroy et al. | 198/461 |
| 3,115,232 | 12/1963 | Carter | 198/626.1 X |
| 3,827,545 | 8/1974 | Buhayar | 198/461 |
| 3,830,355 | 8/1974 | Verjux | 198/461 X |
| 4,364,466 | 12/1982 | Mojden | 198/461 X |
| 4,443,995 | 4/1984 | Myers et al. | 198/461 X |
| 4,709,800 | 12/1987 | Olsen | 198/459 |
| 4,863,154 | 9/1989 | Hirakawa et al. | 198/460 X |

FOREIGN PATENT DOCUMENTS

| | | | |
|---|---|---|---|
| 2204635 | 8/1973 | Fed. Rep. of Germany | 198/461 |
| 0075515 | 3/1990 | Japan | 198/461 |
| 2155426 | 9/1985 | United Kingdom | 198/460 |

*Primary Examiner*—James R. Bidwell
*Attorney, Agent, or Firm*—Sandler, Greenblum and Bernstein

[57] ABSTRACT

A device for equally-spaced in-line transportation of randomly arranged incoming products, such as packets of cigarettes, whereby the products traveling successively and in randomly arranged manner along a first path are brought into engagement with a braking device and fed, in an orderly line, to a transfer device defined by two lobed wheels located on either side of the first path and operating in time with each other, with the braking device and with a conveyor for transporting the products in equally-spaced manner along a second path located in series and in line with the first path.

5 Claims, 1 Drawing Sheet

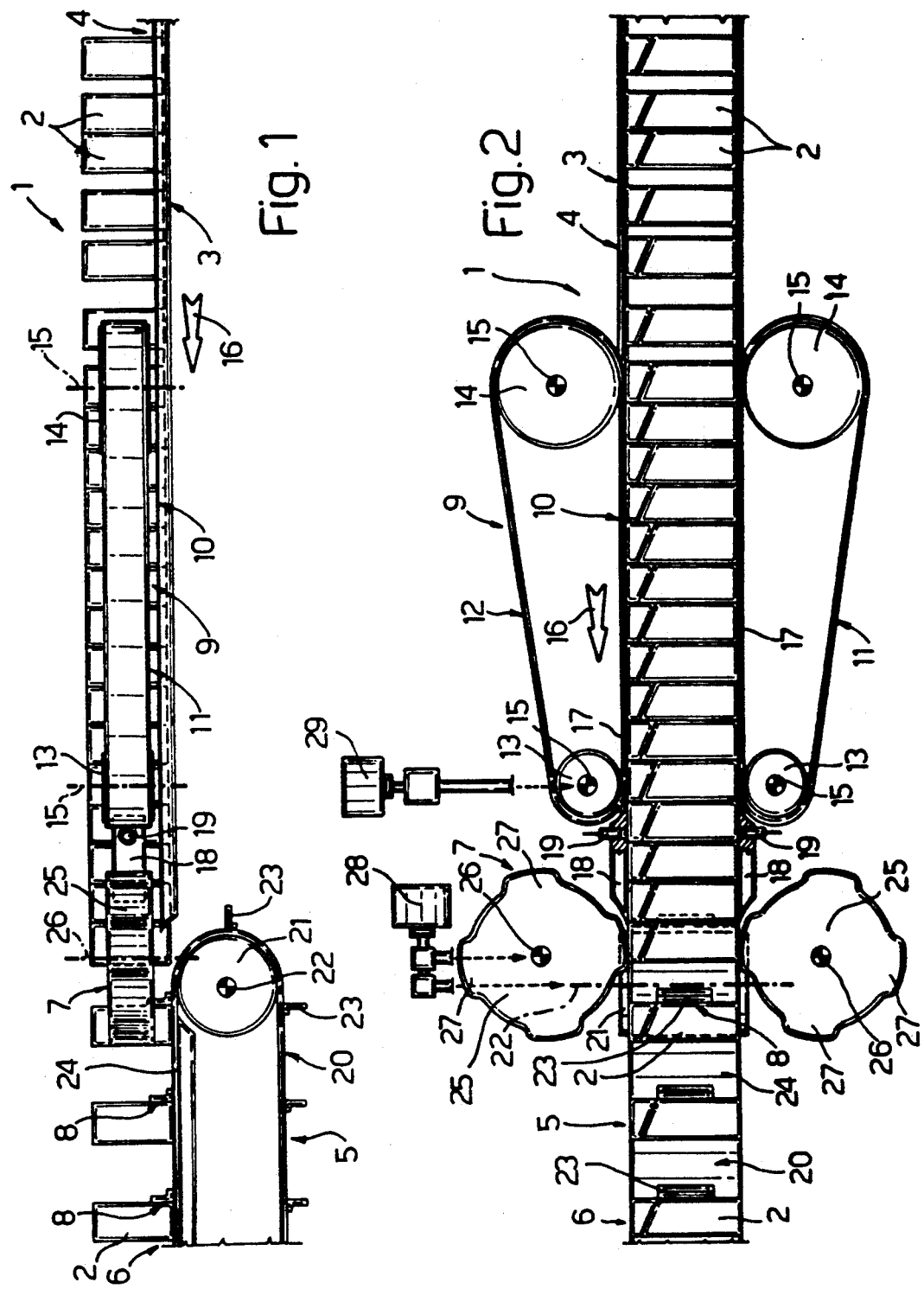

DEVICE FOR EQUALLY-SPACED IN-LINE TRANSPORTATION OF RANDOMLY ARRANGED INCOMING PRODUCTS

BACKGROUND OF THE INVENTION

The present invention relates to a device for transporting randomly arranged incoming products in equally-spaced in-line manner.

Here and hereinafter, the term "in-line" is intended to mean that the products received in randomly arranged manner are equally spaced as they travel along a path involving substantially no or, conversely, substantially continuous variations in the output as compared with the input traveling direction of the products.

The present invention is particularly suitable for packing machines in general, and cigarette packing machines in particular, to which the following description refers purely by way of example.

On cigarette packing machines, the problem of transporting randomly arranged incoming products, in this case packets of cigarettes, in equally-spaced manner is normally solved using devices comprising a first and second conveyor perpendicular to each other; and a transfer device located over the point at which the two conveyors meet, and which provides, at a constant rate, for transferring the packets traveling in randomly arranged manner on the first conveyor from the output end of the first conveyor to the input end of the second conveyor. As they are transferred, the packets are rotated 90° in relation to the traveling direction, so that, if they are traveling, for example, along the first conveyor with the larger side facing forward, they are fed with the smaller side or the end surface facing forward along the second conveyor.

In other words, on known devices of the aforementioned type, equally spacing the randomly arranged incoming packets necessarily involves a 90° variation in the traveling direction of the packets, and, consequently, 90° rotation of the packets in relation to said traveling direction.

Such variations in both the traveling direction and the position of the randomly arranged incoming products in relation to the traveling direction are not always desirable, and pose serious problems as regards the size and overall design of the packing machine.

SUMMARY OF THE INVENTION

It is an object of the present invention to provide a straightforward device for effectively controlling randomly arranged products fed off a production machine or a portion of a production machine, and for transporting the products in equally-spaced in-line manner, i.e. with substantially no variation in the traveling direction of the products or the position of the products in relation to said traveling direction.

According to the present invention, there is provided a device for equally-spaced in-line transportation of randomly arranged incoming products, said device comprising a first conveyor for transporting said products successively and in randomly arranged manner along a first path; a second conveyor for transporting said products continuously and in equally-spaced manner along a second path; transfer means located at the output end of said first path, for transferring said products, at a given rate, from said first to said second conveyor; braking means located along said first path; and drive means for so operating said brake means as to form an orderly line of products for supply to said transfer means; characterized by the fact that said first and said second paths are substantially aligned; and that said transfer means comprise two lobed wheels located on either side of said first path, and rotating continuously about respective axes in opposite directions and in time with each other and said second conveyor; said drive means being provided with control means for transporting the products in said line in time with said lobed wheels.

BRIEF DESCRIPTION OF THE DRAWINGS

A non-limiting embodiment of the present invention will be described by way of example with reference to the accompanying drawings, in which:

FIG. 1 shows a schematic side view of a preferred embodiment of the device according to the present invention;

FIG. 2 shows a plan view of the FIG. 1 device.

DETAILED DESCRIPTION OF THE INVENTION

Number 1 in FIG. 1 indicates a device for transporting randomly arranged incoming packets of cigarettes 2 in equally-spaced in-line manner.

Device 1 comprises a first conveyor 3 for successively transporting randomly arranged packets 2 along a first path 4; a second conveyor 5 for transporting packets 2 in equally-spaced manner along a second path 6 in line with path 4; and a transfer device 7 for successively transferring packets 2 from conveyor 3 into respective seats 8 moving with and equally spaced along conveyor 5.

As shown, particularly in FIG. 2, packets 2 on conveyor 3 initially form a line in which adjacent packets 2 are spaced at random, which situation is maintained until packets 2 engage a braking device 9 by which they are slowed down so as to travel along conveyor 3 in a continuous orderly line 10 contacting one another.

Braking device 9 comprises two powered belts 11, 12 located on either side of the output end portion of conveyor 3, and looped about respective pairs of pulleys 13, 14 fitted to respective shafts 15 perpendicular to the FIG. 2 plane and to the traveling direction 16 of conveyor 3. Belts 11, 12 present two facing straight portions 17 moving in direction 16 at a generally slower speed than conveyor 3 and cooperating with the opposite ends of packets 2 so as to vary the traveling speed of the same.

The end portion of conveyor 3 downstream from braking device 9 in direction 16 presents two plates 18, each aligned with a respective portion 17 and supporting a photosensor 19, which, together with the other photosensor 19, provides for determining the rate and timing with which packets 2 issue from braking device 9, and, if necessary, correcting, in known manner and for the reasons explained later on, the traveling speed of belts 11 and 12.

As shown in FIG. 1, conveyor 5 is located substantially tangent to the output end of conveyor 3, and comprises a powered belt 20 looped about pulleys 21 (only one of which is shown) fitted to respective shafts 22 perpendicular to the FIG. 1 plane. Belt 20 presents a number of equally-spaced brackets 23 moving with belt 20 and defining respective seats 8.

Transfer device 7 is located over top portion 24 of belt 20, and comprises two wheels 25 located on either side of a first input pulley 21 of belt 20, and fitted to respective shafts 26 perpendicular to the FIG. 2 plane and to the plane of conveyors 3 and 5. Wheels 25 each present a number of equally-spaced lobes 27, and are rotated in opposite directions and so timed as to bring two respective lobes 27 simultaneously into a gripping position facing each other and separated by a distance roughly equal to or slightly less than the size of packet 2 measured crosswise in relation to direction 16, so as to grip packet 2 at the output end of conveyor 3 and feed it forward substantially in direction 16. Packet 2 is released by respective lobes 27 on to top portion 24 of belt 20, over input pulley 21 and in time with the arrival of a bracket 23 at the input end of top portion 24.

As already stated, therefore, for enabling packets 2 to be transferred from conveyor 3 to conveyor 5 via transfer device 7, the speed of belts 11 and 12 must normally be less than that of conveyor 3 and substantially such as to keep braking device 9 timed in relation to conveyor 5 and wheels 25, i.e. such as to advance line 10 by a distance equal to the thickness of packet 2 in the time taken for two successive lobes 27 to move into the gripping position, and in the time taken by belt 20 to advance by a distance equal to the length of seat 8, i.e. the distance between adjacent brackets 23.

To meet the above conditions, device 1 comprises a first drive unit 28 for driving conveyor 5 and wheels 25 at constant speed and in time with one another; and a second drive unit 29 for driving belts 11 and 12, and which is controlled in known manner by photosensors 19 for keeping braking device 9 in time with belt 20 and wheels 25.

I claim:

1. A device for equally-spaced in-line transportation of randomly arranged incoming products said device comprising a first conveyor for transporting said products successively and in a randomly arranged manner along a first path; a second conveyor for transporting said products continuously and in an equally-spaced manner along a second path; transfer means located at the output end of said first path for transferring said products, at a given rate, from said first conveyor to said second conveyor; first drive means for operating said second conveyor and said transfer means at constant speeds; braking means located along said first path; and second drive means for operating said brake means so as to form an orderly line of products for supply to said transfer means; said first path and said second path being substantially aligned; and said transfer means comprising two lobed wheels located on either side of said first path, and rotating continuously about respective axes in opposite directions at a constant speed and at the same speed with each other and in time with said second conveyor; said second drive means being provided with control means for controlling the speed of said braking means, wherein said braking means, said second conveyor, and said lobed wheels are driven in time with each other.

2. A device as claimed in claim 1, wherein said braking means are located along a portion of said first conveyor, for braking said products so as to cause said first conveyor and said products to slide in relation to each other.

3. A device as claimed in claim 1, wherein said braking means comprise two belts on either side of said first conveyor.

4. A device as claimed in claim 1, wherein each lobed wheel includes a number of equally-spaced lobes; said first drive means being provided for rotating said two lobed wheels in time with each other and in such a manner as to bring two respective said lobes simultaneously into a gripping position at the output end of said first path; said two lobed wheels being such that said two respective lobes, in said gripping position, are arranged facing each other and separated by a distance at most equal to the size of said packet measured crosswise in relation to the traveling direction of said packets along said first path.

5. A device as claimed in claim 1, wherein said control means comprise means for detecting the feed rate and timing of said products in said line.

* * * * *

UNITED STATES PATENT AND TRADEMARK OFFICE
CERTIFICATE OF CORRECTION

PATENT NO.   : 5,287,954
DATED        : February 22, 1994
INVENTOR(S)  : Florenzo Draghetti It is certified that error appears in the above-indentified patent and that said Letters Patent is hereby corrected as shown below:

On the title page, item (56): Under References Cited insert the followings:
        FOREIGN PATENT DOCUMENTS 2,514,792   10/1975   Fed. Rep. of Germany
8,518,948   09/1985   Fed. Rep. of Germany Signed and Sealed this Twentieth Day of September, 1994

Attest:

BRUCE LEHMAN

Attesting Officer      Commissioner of Patents and Trademarks